(No Model.)  5 Sheets—Sheet 2.
E. P. C. GIROUARD.
MACHINE FOR MAKING AND REFILLING TRENCHES FOR PIPES, CONDUITS, &c.
No. 558,683.  Patented Apr. 21, 1896.
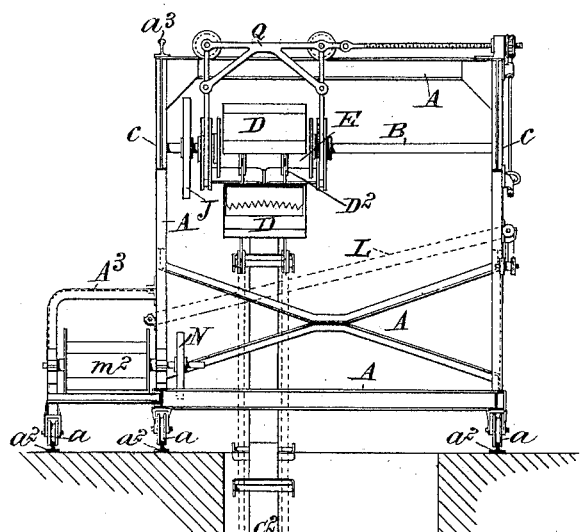
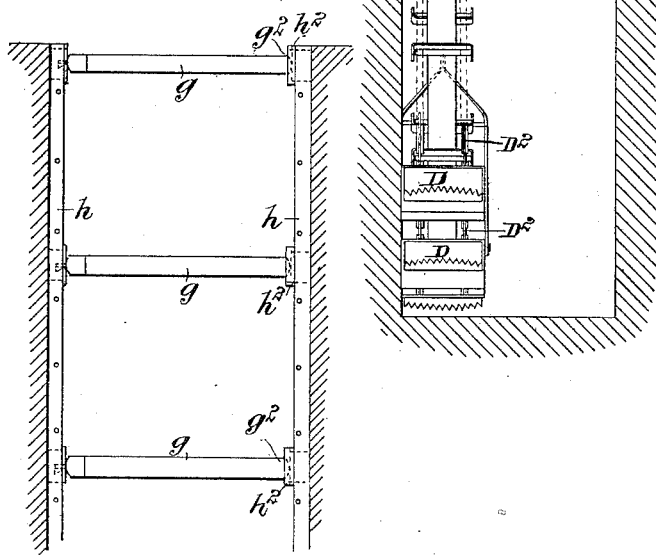
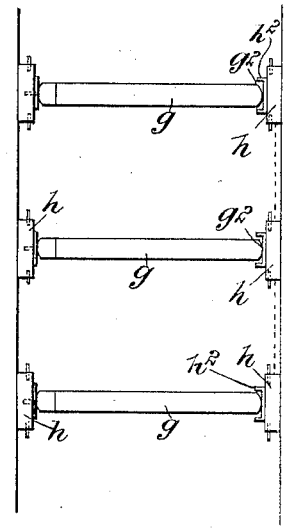
Witnesses
George Baumann
S. C. Connor
Inventor
Edward P. C. Girouard
By his Attorneys
Howson & Howson

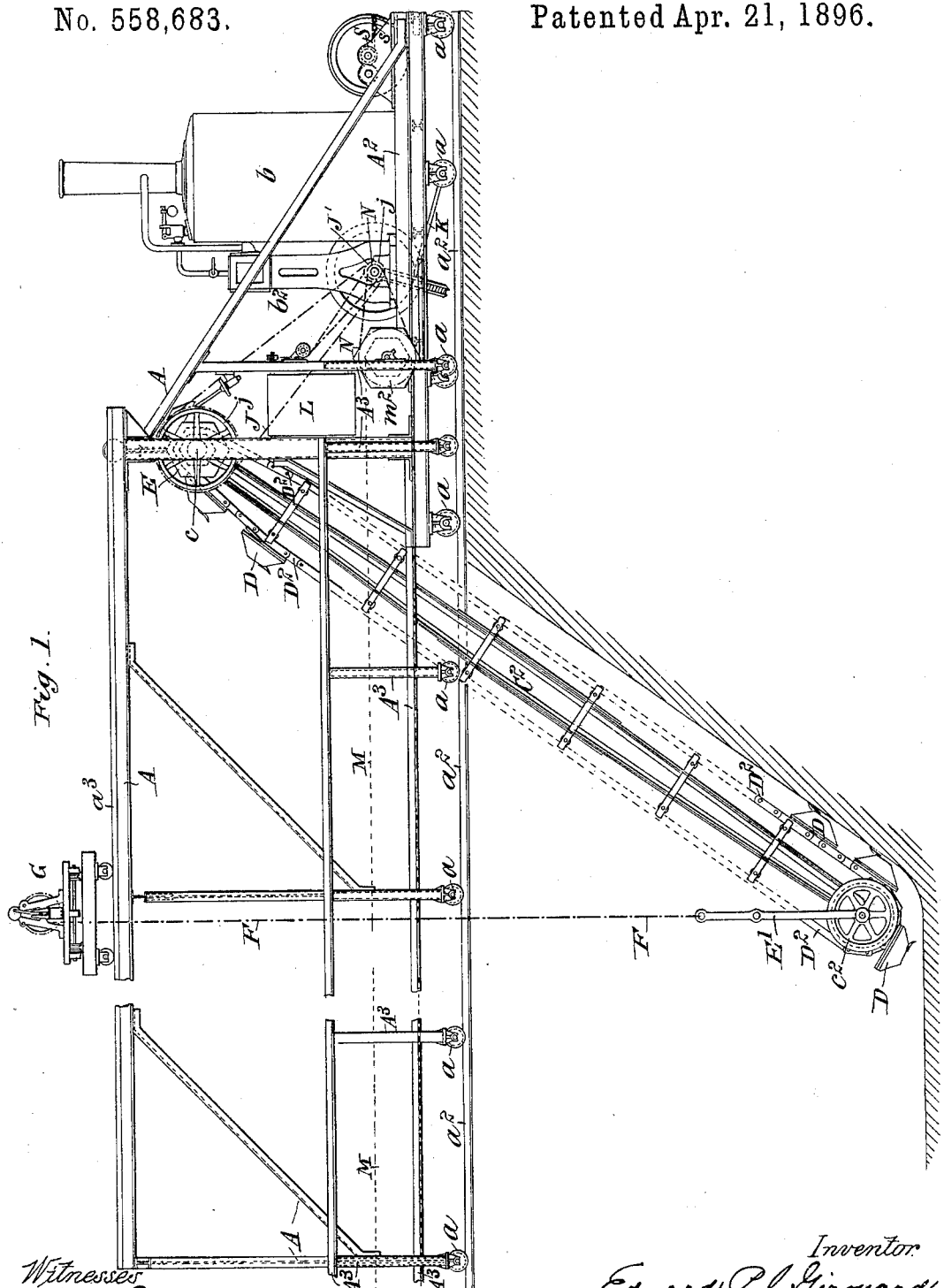

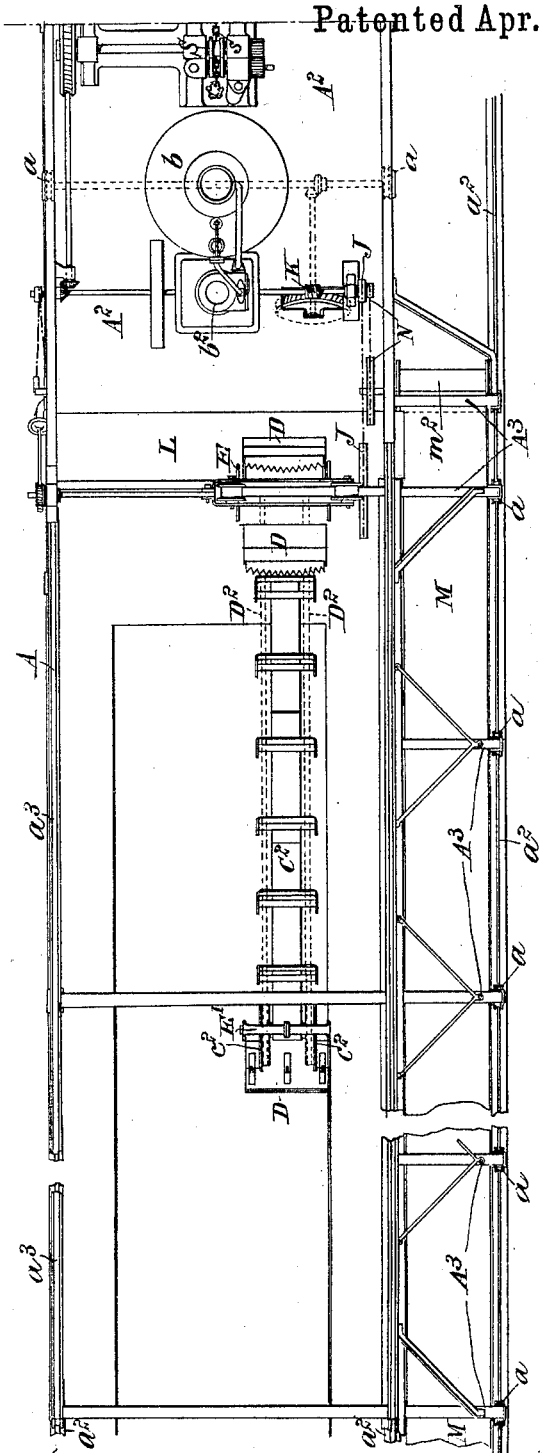

(No Model.) 5 Sheets—Sheet 4.
E. P. C. GIROUARD.
MACHINE FOR MAKING AND REFILLING TRENCHES FOR PIPES, CONDUITS, &c.
No. 558,683. Patented Apr. 21, 1896.
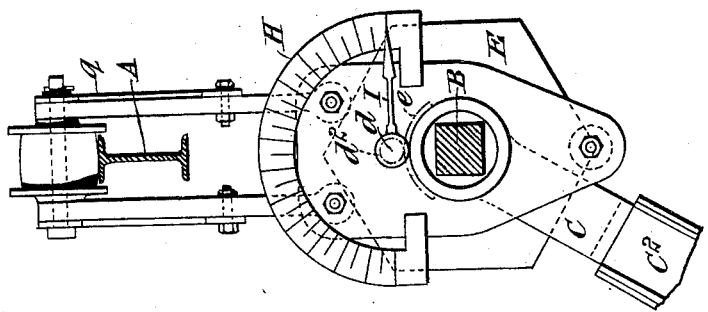
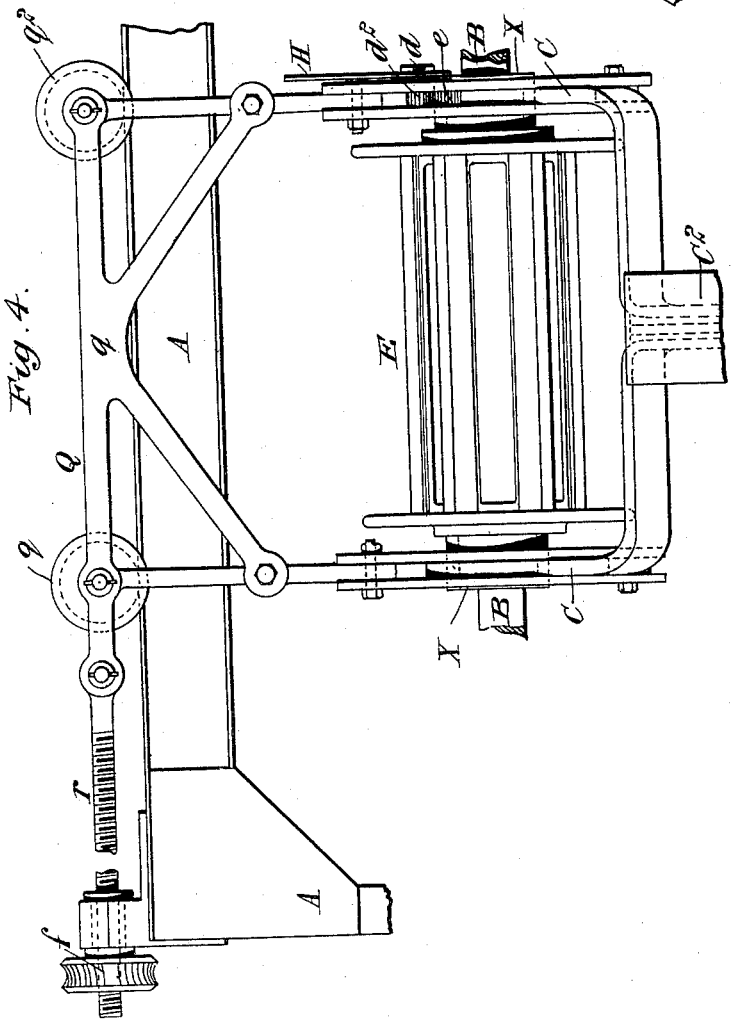

(No Model.) 5 Sheets—Sheet 5.
E. P. C. GIROUARD.
MACHINE FOR MAKING AND REFILLING TRENCHES FOR PIPES, CONDUITS, &c.
No. 558,683. Patented Apr. 21, 1896.
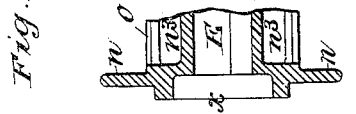
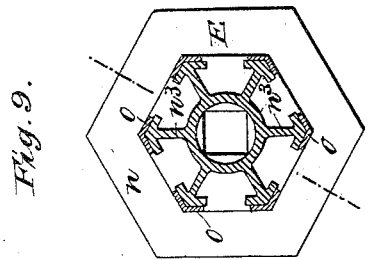
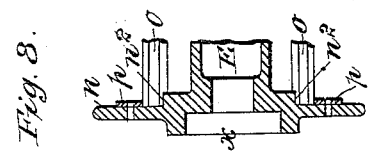
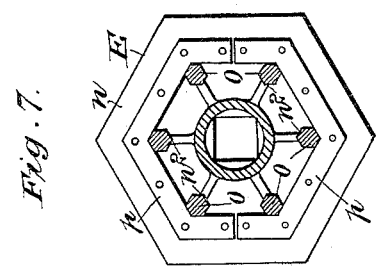
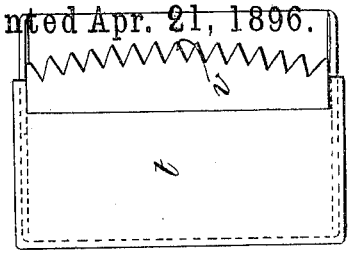
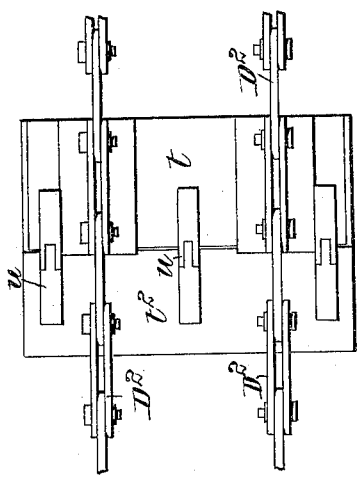
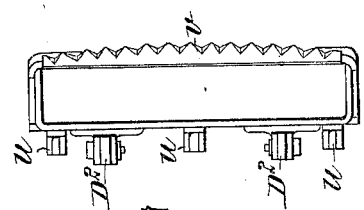
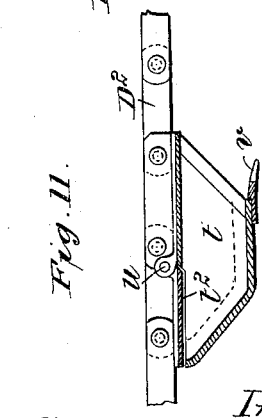
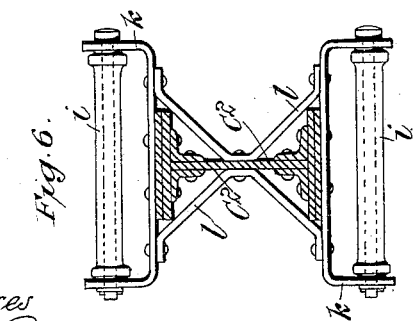
Witnesses
George Baumann
S. C. Connor
Inventor
Edouard P. C. Girouard
By his Attorneys
Howson & Howson

UNITED STATES PATENT OFFICE.

EDOUARD P. C. GIROUARD, OF LONDON, ENGLAND.

MACHINE FOR MAKING AND REFILLING TRENCHES FOR PIPES, CONDUITS, &c.

SPECIFICATION forming part of Letters Patent No. 558,683, dated April 21, 1896.

Application filed April 19, 1895. Serial No. 546,351. (No model.)

*To all whom it may concern:*

Be it known that I, EDOUARD PERCY CRANWILL GIROUARD, lieutenant Royal Engineers, a subject of the Queen of Great Britain and Ireland, residing at the Royal Arsenal, Woolwich, London, in the county of Kent, England, have invented certain Improvements in and Connected with Machines for Making and Refilling Trenches to Contain Pipes, Conduits, or the Like for Water, Sewer, or Gas Pipes, Electric Conduits for Conductors, or the Like, of which the following is a specification.

The object of my invention is to provide a machine, complete in itself, which can be employed for making trenches with facility, expedition, and economy in power and cost, the apparatus being provided with means whereby the "spoil," or earth removed, is returned to the rear of the trench and filled thereinto to close in the trench or the like after the pipes, for instance, which have been laid in the trench have been put in place and the cement has properly set.

According to my invention I provide a framework which is mounted on wheels, which may be capable of running on rails at each side of the trench or the like to be excavated. This framing carries a ladder of diggers and buckets and an engine and boiler for operating it, and also an overhead traveling crane connected to the lower end of the ladder, so that it can be raised and lowered in accordance with the depth of excavation required. When it is most convenient to dig at one operation a trench of the full width desired, the ladder may be arranged and mounted so that after it has dug a part of the width of the trench it can be brought back and then moved sidewise to dig the remainder of the width of the trench. In order to convey the spoil back to fill in the trench again, the apparatus is provided with an apron or traveling platform or inclined chute, by which the spoil is conducted onto a traveling band or platform, which carries the spoil to any required distance to the rear, where it can be delivered onto another apron or traveling platform or inclined chute, by which it is led into the trench.

The accompanying drawings illustrate an apparatus constructed according to my invention adapted for digging trenches or like excavations at two or more longitudinal operations, the apparatus first cutting a trench of, say, about half the width required, and then the ladder of diggers and buckets being moved sidewise and the apparatus being again moved over the same ground to cut the other portion of the trench.

In the accompanying drawings, Figure 1 represents in side elevation, Fig. 2 in end elevation, and Fig. 3 in plan, an apparatus constructed according to my invention. Figs. 4 and 5 are elevations at right angles to each other of a shifter or traveler for supporting the jib or ladder and for traversing it laterally, and Fig. 6 is a transverse section of the jib or ladder drawn to a larger scale. Figs. 7 and 8 are sections at right angles to each other of one form of tumbler over which pass the diggers and buckets. Figs. 9 and 10 are similar views of another form of tumbler. Fig. 11 is a vertical section of one of the diggers or buckets; and Figs. 12, 13, and 14 are respectively an end elevation, a plan, and a view of the under side of the said digger or bucket. Figs. 15 and 16 are respectively a transverse section and plan of a portion of a trench, showing means for bracing the sides thereof.

A is a framing, which may be made of any suitable material and design capable of being readily taken apart for convenience of transport. It is mounted upon wheels $a$, adapted to run upon rails $a^2$ at each side of the trench or the like to be dug. The said framing has at $A^2$ a platform, on which is mounted a boiler $b$ and engine $b^2$, which may be of vertical or any suitable type.

B is a driving-shaft mounted in bearings $c$ in the frame A and receiving motion from the engine $b^2$ by means of a chain J and sprocket-wheels $j$.

The shaft B is rectangular between the bearings $c$, and on this rectangular part is mounted a tumbler E, round which passes the chain of diggers and buckets D.

Q is a shifter or traveler provided with wheels $q^2$, running on transverse girders of the frame A, the said shifter or traveler supporting the jib $C^2$ and ladder of diggers and buckets D. On this shifter or traveler Q are collars X, which engage in recesses $x$ in the tumbler E, so that when the shifter is moved transversely on the frame A it carries with it the jib $C^2$, tumbler E, and the ladder of diggers and buckets D. The lower end of the jib or ladder $C^2$ carries a shaft, on which are wheels $c^2$, over which the chains $D^2$, carrying the diggers and buckets, pass. The lower end of the jib or ladder is connected by the fork E', provided with cutting edges to facilitate its movement through the earth, and the chain F with an overhead crane G, which travels upon rails $a^3$ on the top of the framing A.

H is a scale-plate carried on the shifter or traveler Q, and I is a pointer mounted on a center $d$, provided with a pinion $d^2$, with which gears a segmental rack $e$ on the upper end of the jib or ladder $C^2$, so that as the angle of the jib or ladder is changed the position of the pointer relatively to the scale shows the angle at which the said jib or ladder is situated, and consequently the depth to which the trench is being cut. Motion may be given to the traveling wheels of the machine and to the upper tumbler of the ladder of diggers and buckets by means of any suitable gearing from the engine $b$, so that the machine moves forward the requisite distance for each operation of the diggers and buckets. This is shown in the drawings as being effected by the gear marked J' for the ladder and that marked K for the traversing of the machine.

L is a chute carried by the framing, onto which chute the spoil is delivered by the diggers and buckets, the said spoil then passing off therefrom onto the conveyer M, carried by rollers $m$ $m^2$, the end one, $m^2$, of which may be driven from the engine by the gear N, the said roller $m^2$ being mounted in bearings carried at the front end of the frame A, a roller $m$ being mounted in bearings at the rear end of the conveyer-frame $A^3$, which may extend to any required distance in accordance with that to which the spoil is to be carried for refilling the trench, which refilling may be effected by hand or by a chute or traveling carrier conveying the spoil from the traveler M into the trench.

The traveler or shifter Q hereinbefore referred to is provided with an internal screwed worm-wheel $f$, running upon the screwed shaft $r$, which worm-wheel may be actuated by a rod carrying a worm operated by hand, as shown, or it may be driven from the engine $b$, so that when the said rod is turned the jib or ladder $C^2$ is moved sidewise for operation on another portion of the width of the required trench, as hereinbefore stated.

Instead of traversing the machine by gearing the running wheels to the engine, as before described, a drum or chain-wheel S, driven by the engine, may be provided and having attached to it a hauling-chain $s$, secured at its outer end to an anchor fixed in the ground at some distance ahead. This is provided where the soil is heavy and the weight of the machine is insufficient to keep the diggers and buckets up to their work.

A bracing may be put in the trench as it is made, as shown in Figs. 15 and 16, the said bracing $g$ holding supporting-timbers $h$, which can be removed and the bracing moved forward as the machine moves forward and the supporting-timbers replaced as the digging proceeds. The bracings $g$ are pivoted at one end to the timbers $h$ at one side of the trench, their opposite ends being rounded, as shown at $g^2$, and enter shoes $h^2$, fixed to the supporting-timbers at the opposite side of the trench.

The chains $D^2$, which carry the diggers and buckets, run on rollers $i$, carried on arms $k$, projecting from the jib or ladder $C^2$, as shown in Fig. 6, the said jib or ladder being formed of an I-girder $C^2$, to which the arms $k$ are connected by struts $l$. The tumbler E, round which the chain of diggers and buckets pass, consists of a drum provided with flanges $n$, having notches or recesses $n^2$ for the reception of the ends of steel bars $o$, arranged to form a polygonal (preferably hexagonal) figure, as shown in Figs. 7 and 8, the said steel bars being retained in their notches or recesses by plates $p$, fastened to the interior faces of the flanges $n$. Instead of connecting the steel bars in position by plates $p$, as last described, ribs or webs $n^3$ may be formed on the tumbler, as shown in Figs. 9 and 10, the said ribs extending from one flange to the other thereof, their outer ends being made saddle-shaped to receive correspondingly-shaped steel bars or plates $o$, which may be secured thereon by screws or rivets. The diggers and buckets are each made in two parts $t$ $t^2$, Figs. 11 to 14, hinged together at $u$, the one part, $t$, being rigidly connected to the chains $D^2$ and provided at its front end with teeth $v$, which enter the ground as the said bucket is traversed in contact therewith, whereby the bucket becomes charged with the spoil, and when the bucket is passing round the tumbler E the portion $t$ is caused to open out from the part $t^2$, so as to allow the contents of the bucket to pass out at the rear thereof onto the chute L.

It will be observed, by reference to the foregoing description and to the drawings, that the advance portion of the frame extends at all times over solid ground in advance of the work, and that the heavy operating parts are supported on said advance portion of the frame, so that there is no danger of the sides of the trench being caused to fall in or break down, because the weight of the heavy parts is supported by stable ground and removed from the sides of the trench.

Having now particularly described and ascertained the nature of my said invention and in what manner the same is to be performed, I declare that what I claim is—

1. Apparatus for digging trenches, the said apparatus consisting of the combination with a frame running upon wheels, the advance portion of said frame extending over solid ground in advance of the work and adapted to support the heavy operating parts, of a ladder carrying a series of combined diggers and buckets, and a motor and means for operating the said diggers and buckets, and for traversing the machine, the said operating parts being supported on the advance portion of the frame, and an overhead crane for raising and lowering the said ladder and means for receiving the spoil from the buckets and conveying it backward alongside of the trench, all substantially as described.

2. Apparatus for digging trenches or like excavations the said apparatus consisting of the combination with a frame running upon wheels, the advance portion of said frame extending over solid ground in advance of the work and adapted to support the heavy operating parts, of a ladder carrying a series of combined diggers and buckets, and a motor, and means for operating the said diggers and buckets, and for traversing the machine, the said operating parts being supported upon the advance portion of the frame, and an overhead crane for raising and lowering the said ladder, and means for moving the said ladder sidewise to make more than one longitudinal cut, substantially as described.

3. Apparatus for digging trenches, or the like excavations, the said apparatus consisting of the combination with a frame running upon wheels, of a ladder carrying a series of combined diggers and buckets, and a motor, and means for operating the said diggers and buckets, and for traversing the machine, and an overhead crane for raising and lowering the said ladder and a chute to one side of the apparatus and a conveyer at the side of the trench for conveying the spoil backward alongside of the trench, substantially as described.

4. Apparatus for digging trenches or like excavations, the said apparatus consisting of the combination with a frame running upon wheels, of a ladder carrying a series of combined diggers and buckets, and a motor and means for operating the said diggers and buckets, and for traversing the machine, and an overhead crane for raising and lowering the said ladder, and means for moving the said ladder sidewise to make more than one longitudinal cut, and a chute or its equivalent and a conveyer for conveying the spoil backward alongside of the trench, substantially as described.

In testimony whereof I have signed my name to this specification in the presence of two subscribing witnesses.

E. P. C. GIROUARD.

Witnesses:
   WILLIAM F. UPTON,
   WM. JOHN WEEKS.